US010280527B2

(12) United States Patent
Loewen et al.

(10) Patent No.: US 10,280,527 B2
(45) Date of Patent: May 7, 2019

(54) METHODS OF FABRICATING METALLIC FUEL FROM SURPLUS PLUTONIUM

(75) Inventors: Eric P. Loewen, Wilmington, NC (US); Zachary W. Kosslow, Wilmington, NC (US); John F. Berger, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1263 days.

(21) Appl. No.: 13/613,782

(22) Filed: Sep. 13, 2012

(65) Prior Publication Data

US 2016/0053391 A1 Feb. 25, 2016

(51) Int. Cl.
| | |
|---|---|
| C25C 3/36 | (2006.01) |
| G21C 3/02 | (2006.01) |
| G21C 19/48 | (2006.01) |
| G21C 3/60 | (2006.01) |
| G21C 21/00 | (2006.01) |
| G21C 19/44 | (2006.01) |

(52) U.S. Cl.
CPC .................. *C25C 3/36* (2013.01); *G21C 3/02* (2013.01); *G21C 3/60* (2013.01); *G21C 21/00* (2013.01); *G21C 19/44* (2013.01); *G21C 19/48* (2013.01); *Y02E 30/34* (2013.01); *Y02E 30/38* (2013.01); *Y02W 30/882* (2015.05)

(58) Field of Classification Search
CPC ........... C25C 3/34; G21C 19/42–19/50; C01G 43/003; Y02W 30/88–30/884
See application file for complete search history.

(56) References Cited

U.S. PATENT DOCUMENTS

| | | | | |
|---|---|---|---|---|
| 2,947,672 A | * | 8/1960 | Ervin, Jr. et al. | 205/371 |
| 3,538,542 A | * | 11/1970 | North | B22F 9/10 |
| | | | | 23/293 A |

(Continued)

FOREIGN PATENT DOCUMENTS

| | | | |
|---|---|---|---|
| CN | 101629308 B | * | 12/2010 |
| EP | 1666615 A1 | | 6/2006 |

(Continued)

OTHER PUBLICATIONS

Wittenberg et al., Density and Viscosity of Liquid Pu—U Alloys, 2 Metallurgical Transactions 287 (1971).*

(Continued)

*Primary Examiner* — Bryan D. Ripa
*Assistant Examiner* — Ho-Sung Chung
(74) *Attorney, Agent, or Firm* — Harness, Dickey & Pierce, P.L.C.

(57) ABSTRACT

A method of fabricating metallic fuel from surplus plutonium may include combining plutonium oxide powder and uranium oxide powder to obtain a mixed powder with reduced proliferation potential. The mixed powder may be electroreduced in a bath of molten salt so as to convert the mixed powder to a first alloy. The first alloy may be pressed to remove a majority of the molten salt adhered to the first alloy to form a pressed alloy-salt mixture. The first alloy may be isolated from the salt by melting the pressed alloy-salt mixture. The first alloy may be further processed to fabricate a fuel rod. Accordingly, the metallic fuel produced may be used in a fast reactor system, such as a Power Reactor Innovative Small Module (PRISM).

11 Claims, 1 Drawing Sheet

(56) References Cited

U.S. PATENT DOCUMENTS

| | | | | |
|---|---|---|---|---|
| 3,660,075 | A | * 5/1972 | Harbur | C22B 60/0286 |
| | | | | 75/10.14 |
| 4,120,752 | A | * 10/1978 | Ocken | G21C 3/28 |
| | | | | 376/426 |
| 4,216,058 | A | * 8/1980 | Marwick | G21C 1/00 |
| | | | | 376/102 |
| 4,436,677 | A | 3/1984 | Radford et al. | |
| 4,880,506 | A | * 11/1989 | Ackerman et al. | 205/44 |
| 4,953,317 | A | * 9/1990 | Ruchel | 43/17 |
| 4,963,317 | A | * 10/1990 | Wiencek | G21C 3/06 |
| | | | | 264/0.5 |
| 5,041,193 | A | * 8/1991 | Grantham | 205/43 |
| 5,044,911 | A | 9/1991 | Seidel et al. | |
| 6,056,865 | A | 5/2000 | Amamoto et al. | |
| 6,911,135 | B1 | * 6/2005 | Thied | C22B 60/0278 |
| | | | | 205/44 |
| 7,090,760 | B2 | 8/2006 | Seo et al. | |
| 8,634,514 | B2 | 1/2014 | Vandergheynst | |
| 2002/0149125 | A1 | * 10/2002 | Gradel | G21C 3/623 |
| | | | | 264/0.5 |
| 2004/0103752 | A1 | * 6/2004 | Song | G21C 3/623 |
| | | | | 75/232 |
| 2004/0244533 | A1 | * 12/2004 | Lewin et al. | 75/399 |
| 2006/0219053 | A1 | 10/2006 | Ogasawara et al. | |
| 2010/0071408 | A1 | * 3/2010 | Cho et al. | 62/532 |
| 2010/0126874 | A1 | 5/2010 | Watanabe et al. | |
| 2010/0303193 | A1 | 12/2010 | Walters | |
| 2011/0180409 | A1 | * 7/2011 | Willit | C25C 3/34 |
| | | | | 205/47 |
| 2013/0329849 | A1 | 12/2013 | Mazaudier | |

FOREIGN PATENT DOCUMENTS

| | | | | |
|---|---|---|---|---|
| EP | 2036097 | A1 | 3/2009 | |
| EP | 1805769 | B1 | 12/2009 | |
| EP | 2625691 | B1 | 11/2014 | |
| JP | 63-277995 | | 11/1988 | |
| JP | 3-75590 | A | 3/1991 | |
| JP | 04-122895 | | 4/1992 | |
| JP | 08-054493 | | 2/1996 | |
| JP | H08-233987 | A * | 9/1996 | G21C 19/44 |
| JP | 10-332880 | A | 12/1998 | |
| JP | 2004-069383 | A | 3/2004 | |
| JP | 2005-068539 | A | 3/2005 | |
| JP | 2008-518202 | A | 5/2008 | |
| JP | 2009-540313 | A | 11/2009 | |
| JP | 2014-501907 | A | 1/2014 | |
| NL | 7500663 | A * | 11/1975 | G21C 19/48 |
| WO | WO-03/077262 | A1 | 9/2003 | |
| WO | WO-2005/021809 | A1 | 3/2005 | |
| WO | WO-2007/011382 | A1 | 1/2007 | |
| WO | WO-2007/144414 | A1 | 12/2007 | |
| WO | WO-2012-045740 | A1 | 4/2012 | |

OTHER PUBLICATIONS

Sridharan, Thermal Properties of LiCl—KCl Molten Salt for Nuclear Waste Separation (2012).*

Herrmann et al., Electrolytic Reduction of Spent Oxide Fuel—Bench-Scale Test Results, Global 2005 (2005).*

Kolodney, Preparation of the First Electrolytic Plutonium and of Uranium from Fused Chlorides, 129 (11) J. Electrochem. Soc. 2438 (1982).*

Fujita, English Abstracts and machine translation, H08-233987 A (1996).*

Herrmann et al., Electrolytic Reduction of Spent Oxide Fuel—Bench-Scale Test Results, Global 2005 Proceedings (2005).*

Centre d'Etude de l'Energie nucleaire, English Abstract and Machine Translation (1975).*

Lee et al., Assessment of a High-Throughput Electrorefining Concept for a Spent Metallic Nuclear Fuel—I: Computational Fluid Dynamics Analysis, 162 Nuclear Tech. 107 (2008).*

Zhai et al., English abstract and machine translation, CN 101629308 B (2010).*

European Office Action issued in European Patent Application No. 13184181.9 dated Dec. 15, 2016.

* cited by examiner

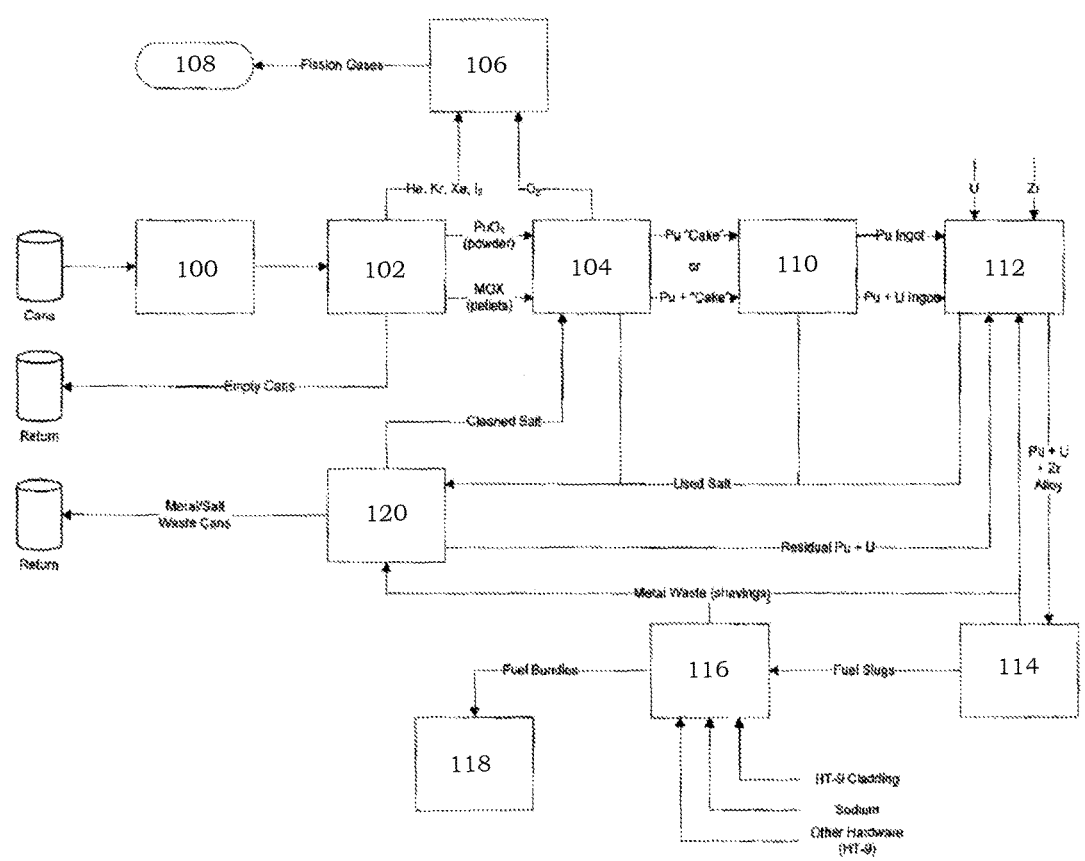

METHODS OF FABRICATING METALLIC FUEL FROM SURPLUS PLUTONIUM

BACKGROUND

Field

The present disclosure relates to methods of fabricating nuclear fuel.

Description of Related Art

Relatively large stockpiles of weapons-grade plutonium were built up by various countries during the Cold War. Additionally, more reactor-grade plutonium is being produced every year as a by-product of the nuclear power industry. The accumulation of plutonium presents toxicity and proliferation concerns. To reduce this accumulation, efforts have been made to utilize the plutonium as fuel for nuclear reactors. Converting plutonium into a usable nuclear fuel conventionally requires manufacturing the fuel into oxide form. However, manufacturing the fuel into oxide form involves numerous steps and is expensive, thereby hindering the use of more plutonium as an energy source.

SUMMARY

A method of fabricating metallic fuel from surplus plutonium may include combining plutonium oxide powder and uranium oxide powder to obtain a mixed powder with reduced proliferation potential. The mixed powder may be electroreduced in a bath of molten salt so as to convert the mixed powder to a first alloy. The first alloy may be pressed to remove a majority of the molten salt adhered to the first alloy to form a pressed alloy-salt mixture. The first alloy may be isolated from the salt by melting the pressed alloy-salt mixture.

The combining step may include introducing the plutonium oxide powder at a quantity of about 20% to 50% by weight relative to a total weight of the mixed powder. Additionally, the combining step may include ensuring that the uranium oxide powder has a $^{235}U$ enrichment of less than 5.0 wt %.

The electroreducing step may include loading the mixed powder into a porous basket followed by immersion in the bath of molten salt. Additionally, the electroreducing step may include producing the first alloy so as to be in a form of a dendritic structure.

The pressing step may include removing at least 80% of the molten salt adhered to the first alloy. Additionally, the pressing step may include a simultaneous application of heat (e.g., hot press) to facilitate removal of the molten salt adhered to the first alloy.

The isolating step may include separating the first alloy from the molten salt based on density. The method may further include reintroducing the molten salt back into the bath of molten salt after the pressing step and isolating the first alloy step.

The method may further include adding zirconium or zirconium-like metals (e.g., Group 4 metals) and uranium metal to the first alloy after the isolating so as to form a second alloy. The adding zirconium metal and uranium metal step may be performed such that the second alloy has about 20% to 50% plutonium by weight. A desired reactor component, such as a fuel rod, may be formed from the second alloy.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 1 is a schematic view of a method of fabricating a metallic fuel from surplus plutonium according to an example embodiment.

DETAILED DESCRIPTION

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a schematic view of a method of fabricating a metallic fuel from surplus plutonium according to an example embodiment. Referring to FIG. 1, cans of powdered plutonium oxide are delivered to a can receiving center 100. The plutonium may be recovered from used nuclear fuel (reactor-grade) or nuclear weapon stockpiles (weapons-grade) using reprocessing. The can receiving center 100 is designed to receive a spectrum of can sizes. In addition, the can receiving center 100 is capable of accepting a variety of nuclear feed material with respect to can configurations as well as different isotopic mixtures of plutonium, uranium, and/or other contaminants (e.g., MOX pellets). The cans received can also be placed into storage so that the fuel fabrication processes are independent from the timeliness of delivery of the nuclear feed material to the point of operation. The storage area may be designed to store up to two years' worth of nuclear feed material, although example embodiments are not limited thereto.

From the can receiving center 100, the cans are transferred to a can processing center 102. At the can processing center 102, the cans are opened by standard mechanical means. Mechanical energy (e.g., vibration) may be used as needed to remove the solid plutonium oxide (or uranium oxide or MOX pellets) from the cans. The plutonium oxide may be in the form of $PuO_2$, while the uranium oxide may be in the form of $UO_2$, $U_3O_8$, and/or $UO_3$. The plutonium oxide from the cans may be emptied into a sifter/screening device and blended with uranium oxide in a hopper to obtain a mixed powder.

The introduction of the plutonium oxide powder and the uranium oxide powder may occur simultaneously. In a non-limiting embodiment, the mixed powder includes about 50% by weight of the plutonium oxide powder and about 50% by weight of the uranium oxide powder. However, it should be understood that the plutonium oxide powder may be combined at a quantity of about 20% to 50% by weight relative to a total weight of the mixed powder. Additionally, the uranium oxide may have a $^{235}U$ enrichment of less than 20 weight percent (e.g., less than 10 weight percent, less than 5.0 weight percent).

The blending may be performed with standard industry methods that are used in the nuclear fuel fabrication field and/or other related industries that mix solid powders. The combination with uranium oxide powder to form the mixed powder reduces the proliferation potential of the plutonium oxide powder. Forming the mixed powder also increases the passive safety of the facility by reducing the criticality concerns of the plutonium feed stock.

The gases and/or particulates from the cans are directed by a ventilation system from the can processing center 102 to an off-gas treatment system 106. Additionally, it should be understood that each of the sectors discussed herein may be provided with an adequate ventilation system to ensure the removal of fugitive dust particles and/or gases released or produced during operation. The off-gas treatment system 106 is designed to reduce worker exposure, reduce the volume of low level waste, and improve in the recovery of nuclear materials for recycle. The off-gas treatment system 106 may include a sintered metallic membrane (HEPA standard) that retains particulates while allowing gases to pass for further treatment. The gases may be stored in a storage chamber 108. The off-gas treatment system 106 may also include a vibration system, a liquid fill and liquid drain to facilitate chemical cleaning, a dust/solids extraction system for the recycle of nuclear material, and/or a blow-back system if the differential pressure becomes exceeds a desired level due to powder accumulation in the sintered metallic membrane.

After the blending, the mixed powder may be sampled to verify its composition for further processing and criticality verification. From the can processing center 102, the mixed powder is transferred to the electroreducer 104 and loaded into porous baskets. In the electroreducer 104, the mixed powder is subjected to an electrolytic oxide reduction process via immersion in a bath of molten salt so as to convert the mixed powder to a first alloy. In particular, the mixture of the plutonium oxide powder and uranium oxide powder are converted in the electroreducer 104 from a metal oxide to a mixture of plutonium metal and uranium metal. Although the first alloy may include the plutonium metal and uranium metal, it should be understood that the first alloy is not precluded from including other metals. The electroreducer 104 may be as described in the following related applications, the entire contents of each of which are incorporated herein by reference.

| Related Applications Incorporated by Reference | | | |
|---|---|---|---|
| U.S. application No. | HDP/GE Ref. | Filing Date | Title |
| 12/978,027 | 8564-000228/US 24AR246140 | Filed on Dec. 23, 2010 | ELECTROLYTIC OXIDE REDUCTION SYSTEM |
| 13/335,082 | 8564-000252/US 24NS250931 | Filed on Dec. 22, 2011 | ELECTROREFINER SYSTEM FOR RECOVERING PURIFIED METAL FROM IMPURE NUCLEAR FEED MATERIAL |
| 13/453,290 | 8564-000262/US 24AR253193 | Filed on Apr. 23, 2012 | METHOD FOR CORIUM AND USED NUCLEAR FUEL STABILIZATION PROCESSING |

After conversion of the mixed powder from a metal oxide to a pure metal/alloy, the resulting mixture of the plutonium metal and uranium metal exit the molten salt bath of the electroreducer 104 in the form of a dendritic structure (e.g., cake). For example, the mixture of the plutonium metal and uranium metal may be in a form of a porous metal sponge with a relatively high surface area. However, this relatively high surface area also results in the adhesion and inclusion of the molten salt from the electroreducer 104.

To remove the molten salt, the plutonium/uranium alloy is transferred from the baskets of the electroreducer 104 to the pressing station 110. In the pressing station 110, the plutonium/uranium first alloy is mechanically pressed to remove a majority of the molten salt adhered to the first alloy to form a pressed alloy-salt mixture (e.g., ingot). The pressing may include a simultaneous application of heat to facilitate removal of the molten salt adhered to the first alloy. For example, the pressing may be performed in a heated apparatus. Alternatively, the press itself may include heating elements so as to form a hot press. As a result of the pressing in the pressing station 110, at least 80% of the molten salt adhered to the first alloy may be removed, although example embodiments are not limited thereto. Furthermore, the salt removal via pressing is a lower temperature process (compared to salt removal via a cathode processor) and mitigates the release of volatile americium from the metal mixture.

After the pressing station 110, the pressed alloy-salt mixture is transferred to the alloy processing cell 112. In the alloy processing cell 112, the first alloy is isolated from the salt by melting the pressed alloy-salt mixture. For instance, the pressed alloy-salt mixture may be heated with an induction coil in a graphite-lined furnace, although example embodiments are not limited thereto. The molten first alloy may have a density of about 18 g/cc, while the molten salt (and other contaminants) may have a density of about 2-3 g/cc. Thus, during the melting process, the denser molten first alloy will sink to the bottom of the molten mixture, while the lighter molten salt will float above the molten first alloy to the top of the molten mixture. As a result, the first alloy can be separated from the molten salt based on density. For example, the molten first alloy may be discharged from the bottom of the furnace while leaving the molten salt. Also, the two-layer stratification of the molten salt and molten first alloy reduces the amount of volatile metal americium released from the molten mixture.

Zirconium metal and more uranium metal may be added to the isolated first alloy to form a second alloy. In a non-limiting embodiment, the second alloy may be composed of about 20% plutonium and 10% zirconium, with the balance being uranium. However, it should be understood that other compositions are also possible, as required by fuel specifications. For instance, the second alloy may have about 20% to 50% plutonium by weight (e.g., 30%, 40%), although example embodiments are not limited thereto. Additionally, zirconium-like metals (e.g., Group 4 metals) may also be added to the isolated first alloy in lieu of or in addition to the zirconium.

Molten salt from the electroreducer 104, the pressing station 110, and/or the alloy processing cell 112 may be transported to the waste treatment block 120 for recycling or disposal. Thus, after the pertinent processing in the waste treatment block 120, the molten salt may be reintroduced back into the molten salt bath of the electroreducer 104. In addition, residual plutonium and uranium recovered in the waste treatment block 120 may be transported back to the alloy processing cell 112 for subsequent use. Alternatively, the molten salt may be processed for waste disposal. For example, the salt may be transferred into an inductively-heated furnace and combined with a suitable stabilizer that will bind the salt into a stable waste form. Various systems (e.g., borosilicate glass, zeolite, synrock, iron sulfide) are available to stabilize the salt for disposal.

From the alloy processing cell 112, the second alloy may be transferred to the casting cell 114. In the casting cell 114, the second alloy is placed in a suitable form (e.g., fuel slug) with the appropriate geometry for subsequent assembly (e.g., fuel pin assembly) and/or processing. For instance, the second alloy may be used to form a fuel rod or other related and/or suitable components. Alternatively, the second alloy may be transferred from the alloy processing cell 112 into storage for later use.

From the casting cell 114, the fuel slugs may be transferred to an inventory cell. In the inventory cell, fuel slugs from a particular batch containing a certain alloy and isotopic composition may be organized and placed into trays with bar codes for material control and accountability. The trays with the fuel slugs are stored in a critically-safe container and arrangement. During the production process, the inventory cell is capable of accessing and retrieving a selected tray containing fuel slugs of the desired composition in an automated fashion.

From the inventory cell, the selected tray of fuel slugs is transferred to the assembly cell 116. In the assembly cell 116, various parts (e.g., cladding, end fittings, inlet nozzle, sodium for bonding, and other necessary hardware) are assembled into fuel pins, which are loaded with the selected fuel slugs. The fuel pins are then assembled into fuel bundles. In the event that the metallic fuel uses a sodium bond, an extra process step is added to heat the fuel bundle to a temperature above the melting point of the sodium to allow the fuel pin to settle. Allowing the fuel bundle to cool will cause the sodium to freeze. The fuel bundle may be inspected with a non-destructive assay (NDA), e.g., neutron or gamma integration, to ensure that the fuel is in the proper alignment and is of the desired enrichment.

After assembly, the fuel bundles are transferred to the fuel storage facility 118. The fuel storage facility 118 uses geometry control with regard to arrangement of the fuel bundles to prevent criticality and also utilizes concrete walls containing an absorbing material in the concrete matrix such that the concrete acts as a net absorber as opposed to a reflector. The metallic fuel produced herein may be used in a fast reactor system, such as a Power Reactor Innovative Small Module (PRISM), to create a sustainable fission reaction that generates heat and fission products. The heat is converted to steam, which is then converted to mechanical energy to produce electricity. The fission products result in a very high gamma radiation field and serve as a proliferation barrier to the diversion of this fuel to make weapons. The method disclosed herein also adds proliferation resistance by increasing the mass of the unit (e.g., increasing the mass of a 7 kg can of plutonium oxide to a half-ton fuel bundle) and downgrades the plutonium enrichment (e.g., from 100% to 20%).

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A method of fabricating metallic fuel from surplus plutonium, the method comprising:
combining plutonium oxide powder consisting essentially of $PuO_2$ with uranium oxide powder to obtain a mixed powder, the plutonium oxide powder being present at a quantity of about 20% to 50% by weight relative to a total weight of the mixed powder, the uranium oxide powder having a $^{235}$U enrichment of less than 5.0 wt %;

electroreducing the mixed powder in a porous basket immersed in a bath of molten salt so as to convert the mixed powder to a first alloy of plutonium and uranium, the first alloy being in a form of a porous metal sponge;

pressing the first alloy to remove a majority of the molten salt adhered to the first alloy to form a pressed alloy-salt mixture; and isolating the first alloy from a remainder of the molten salt by melting the pressed alloy-salt mixture via electromagnetic induction in a furnace and discharging the first alloy from a bottom of the furnace.

2. The method of claim 1, wherein the pressing includes removing at least 80% of the molten salt adhered to the first alloy.

3. The method of claim 1, wherein the pressing includes a simultaneous application of heat to facilitate removal of the molten salt adhered to the first alloy.

4. The method of claim 1, further comprising:
reintroducing the molten salt back into the bath of molten salt after the pressing and isolating the first alloy.

5. The method of claim 1, wherein the plutonium oxide powder is from a can of a recovered product of reprocessed nuclear fuel or nuclear weapons.

6. The method of claim 1, further comprising:
sampling the mixed powder to verify a quantity of the plutonium oxide powder therein prior to the electroreducing.

7. The method of claim 1, wherein the plutonium oxide powder and the uranium oxide powder are not commingled until the combining to obtain the mixed powder.

8. The method of claim 1, further comprising:
adding a Group 4 metal and uranium metal to the first alloy after the isolating so as to form a second alloy.

9. The method of claim 8, wherein the adding a Group 4 metal and uranium metal is performed such that the second alloy has about 20% to 50% plutonium by weight.

10. The method of claim 8, wherein the adding a Group 4 metal includes introducing zirconium to the first alloy.

11. The method of claim 8, further comprising:
forming a fuel rod from the second alloy.

* * * * *